Dec. 24, 1940.　　　V. C. HODGES　　　2,226,227

CLUTCH

Filed Dec. 7, 1939

INVENTOR.
Vera C. Hodges
BY Carlos G. Stratton
ATTORNEY.

Patented Dec. 24, 1940

2,226,227

UNITED STATES PATENT OFFICE 2,226,227

CLUTCH

Vera C. Hodges, Los Angeles, Calif.

Application December 7, 1939, Serial No. 307,937

5 Claims. (Cl. 74—7)

My invention relates to clutches and more particularly to automatic engagement and disengagement means.

The present means may be used as part of a starter mechanism for airplanes and other motor driven vehicles.

An important object of the invention is to provide automatic means for releasing one jaw of the clutch mechanism when the engine which is actuated has been started.

Another object of the invention is to provide a movable jaw of the clutch mechanism that moves into engagement with the other jaw in a straight, rather than a spiral, path.

The invention also comprises novel details of construction and novel combinations and arrangements of parts, which will more fully appear in the course of the following description. However, the drawing merely shows and the following description merely describes an embodiment of the present invention, which is given by way of illustration or example only.

In the drawing, like reference characters designate similar parts in the several views.

Figure 1:
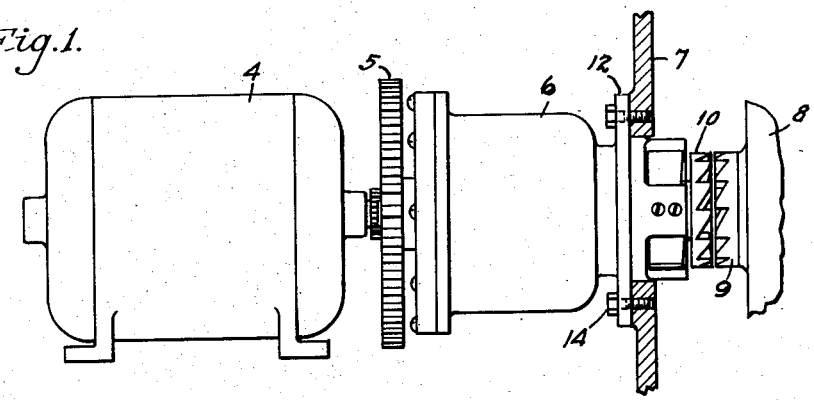
Figure 1 is an elevation of an embodiment of the invention, partly in section and partly broken away.

Referring more in detail to the drawing, a starting motor is shown at 4. A gear train 5 connects the motor 4 with the starter mechanism, hereinafter more fully described. A housing 6 for the mechanism is mounted on a relatively fixed portion 7 of the airplane or other vehicle. The mounting is effected by means of a flange 12 that is bolted to the part 7. Openings 13 of the flange 12 receive bolts 14 when the housing is mounted as stated.

A propeller 8, or other driven mechanism, is arranged with a jaw 9 opposite a movable jaw 10 of the starter mechanism. Teeth of the jaws 9 and 10 are arranged to engage when the jaw 10 is moved outwardly from the starter mechanism.

Reference is made to my co-pending application on Gear reduction Serial No. 307,938 filed contemporaneously herewith, for matter shown and described, but not claimed herein.

My said co-pending application describes in detail my gear reduction comprising a fixed ring gear 15 and a rotary ring gear 16 which are engaged by planetary gears 17 and 18 respectively. Spur gears 19 and 20 are mounted on a main shaft 21, which shaft is in turn driven by the gear train 5. Yokes 22 and 23 respectively mount the planetary gears 17 and 18 for simultaneous rotation around the shaft 21. For further details of the construction of this gear reduction, reference is made to my said co-pending application.

A cylindrical flange 24 on the rotary ring gear 16 encloses a series of friction plates 25 and 26. The plates 25 are cut to provide tongues that fit in splines 27 in an enlarged portion 28 of the shaft 21. The plates 26 and their periphery are notched to receive ribs 29 on the inner circumference of the cylindrical flange 24. The friction plates 25 and 26 alternate. Further illustration and description of the friction plates is believed unnecessary since they are well known to those skilled in this art.

Superposed springs 30, in the form of spider legs, tend to urge the friction plates 25, 26 together, at one side of the series. Fiber disk 31 is arranged between the last plate of the series and an annular plate 32 riveted to the rotary ring gear 16. Ball bearings 33 are arranged to support the rotary ring gear 16 upon the shaft 21.

A screw plate 34 is screwed into a tapped end 35 of the cylindrical flange 24. The screw plate 34 adjusts the tension of the springs 30 upon the friction plates. Ball bearings 36 rotatably support a splined extension 37 of the shaft portion 28. It will be noticed that the splines 38 thereof are straight and not helical.

Integrally mounted on the jaw 10 is a hollow element 39 whose inner circumference is splined to fit the splined shaft portion 37 and whose outer circumference is helically grooved, as shown at 40. The jaw 10 and element 39 are movable lengthwise on the splined shaft portion 37.

A plurality of lugs 41 are arranged around the element 39. Springs 42 are bolted at one end to the lugs 41 and the other ends of the springs carry bosses 43 which fit in the grooves 40.

Figure 2:
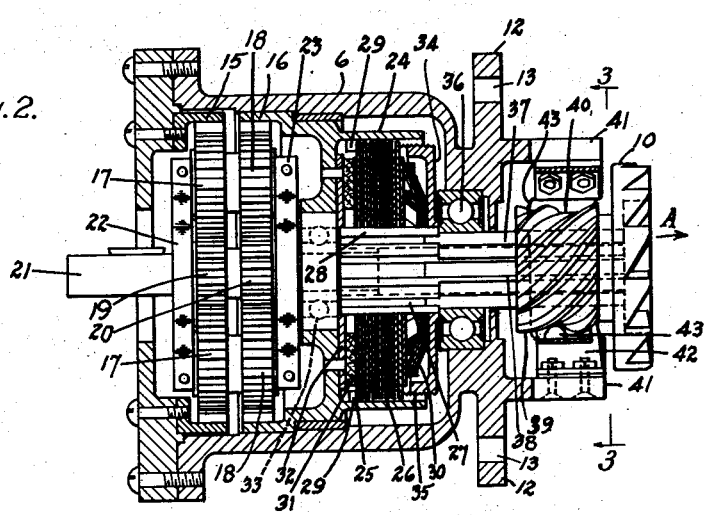
Figure 2 is an enlarged, horizontal section, showing details of the mechanism.
Figure 3:
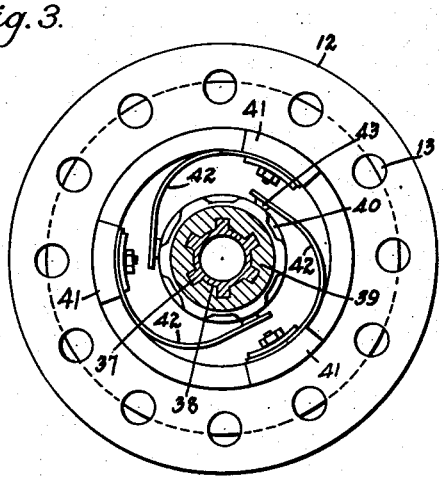
Figure 3 is a section taken on the line 3—3 of Figure 2, looking in the direction of the arrows.

In the operation of the device, the starter motor operates the gear reduction mechanism, which drives the splined shaft portion 37 through the intermediary of the friction disks 25, 26. Rotation of the splined shaft 37 of course rotates spiral element 39. However, the bosses 43 in the spirals of said element cause movement of the element 39 in the direction of the arrow A of Figure 2. This forward movement causes the teeth of jaw 10 to engage with the teeth of the jaw 9, thus rotating the propeller 8, or other driven element.

It is to be understood that a motor or prime mover (not shown) is started by rotation of the propeller 8, or other driven element, through the intermediary of the clutch mechanism herein described. As soon as the motor or prime mover (not shown) is started, the inclination of the teeth of the jaw 9 move the teeth of the jaw 10 out of engagement therewith. Such movement of the jaw 10 is lengthwise of the splined shaft 37 and not spirally thereof. It is of course understood that the springs 42 are strong enough to cause forward movement of the spiral element 39 and the jaw 10, when the splined shaft 37 is rotated, but such springs do not prevent rapid retraction of the jaw 10 and element 39 when the propeller, or other driven member, is in operation. During such retraction, the bosses 43 ride over the helical ribs of the element 39 without injury thereto, since the bosses 43 are rounded.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications which may fall within the scope of the appended claims.

Having thus described my invention, what I claim and desire to secure by Letters Patent is:

1. In clutch mechanism connected with driving means, a splined shaft driven by such means, the shaft being substantially fixed against longitudinal movement, a spiral element meshing with a spline of the shaft, to effect conjunctive rotation of the shaft and the spiral element, clutch members arranged to be moved into and out of engagement with each other, one of the clutch members being connected to be moved by the spiral element and to be moved into engagement with the other clutch member when the spiral element is moved longitudinally of the splined shaft, and means having a non-rotatable support and yieldable into and out of operative engagement with the spiral element during rotation thereof effecting movement of the element longitudinally of the shaft in one direction and permitting such movement of the element in the opposite direction.

2. In clutch mechanism connected with driving means, a splined shaft driven by such means, the shaft being substantially fixed against longitudinal movement, a spiral element meshing with a spline of the shaft, to effect conjunctive rotation of the shaft and the spiral element, clutch members arranged to be moved into and out of engagement with each other, one of the clutch members being connected to be moved by the spiral element and to be moved into engagement with the other clutch member when the spiral element is moved longitudinally of the splined shaft, and spring means having a non-rotatable support and yieldable into and out of operative engagement with the spiral element during rotation thereof, effecting movement of said element longitudinally of the shaft in one direction.

3. In clutch mechanism connected with driving means, a splined shaft driven by such means, the shaft being substantially fixed against longitudinal movement, a spiral element meshing with a spline of the shaft, to effect conjunctive rotation of the shaft and the spiral element, clutch members arranged to be moved into and out of engagement with each other, one of the clutch members being connected to be moved by the spiral element and to be moved into engagement with the other clutch member when the spiral element is moved longitudinally of the splined shaft, spring means mounted on a relatively fixed element, and boss means on the spring means arranged to engage the spiral element during rotation thereof, effecting movement of said element longitudinally of the shaft, the boss means being adapted to ride over spiral ribs on the element during return movement of the element.

4. In clutch mechanism, a splined shaft, a spiral element meshing with a spline of the shaft, to effect conjunctive rotation of the shaft and the spiral element, clutch members arranged to be moved into and out of engagement with each other, one of the clutch members being connected to be moved by the spiral element and to be moved into engagement with the other clutch member when the spiral element is moved longitudinally of the splined shaft, and means having a non-rotatable support and operatively engaging the spiral element during rotation thereof for effecting movement of said element longitudinally of the shaft in one direction, said means being yieldable out of operative engagement with the spiral element during longitudinal movement of the latter in the opposite direction.

5. In a clutch mechanism, a driving shaft, a spirally ribbed member splined on said shaft for rotation therewith and axially shifting movement with respect thereto, a pair of clutch members, one of which is fixed to said splined member for shifting movement therewith toward and away from the other, and stationarily supported means in operative engagement with said spiral ribs to shift said splined member and its clutch member for clutch engaging movement in one direction, whenever said splined member is rotated, said means including elastic portions flexible radially with respect to the splined member and being thereby yieldable out of operative engagement with the spiral ribs during clutch-disengaging movement of the splined member and its clutch member, in the opposite direction.

VERA C. HODGES.